Figure 1:
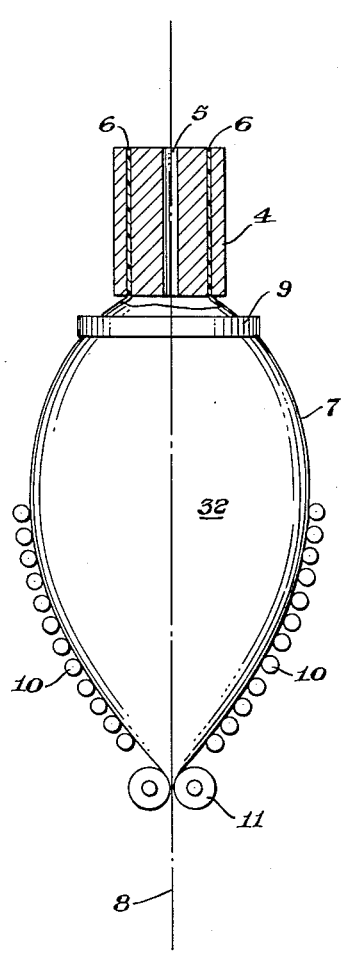

Dec. 13, 1960  H. G. AHLICH ET AL  2,963,742
FILM TUBE GUIDE

Filed March 18, 1957  2 Sheets-Sheet 1

INVENTORS.
Harold G. Ahlich
James L. Amos

BY Griswold & Burdick
ATTORNEYS

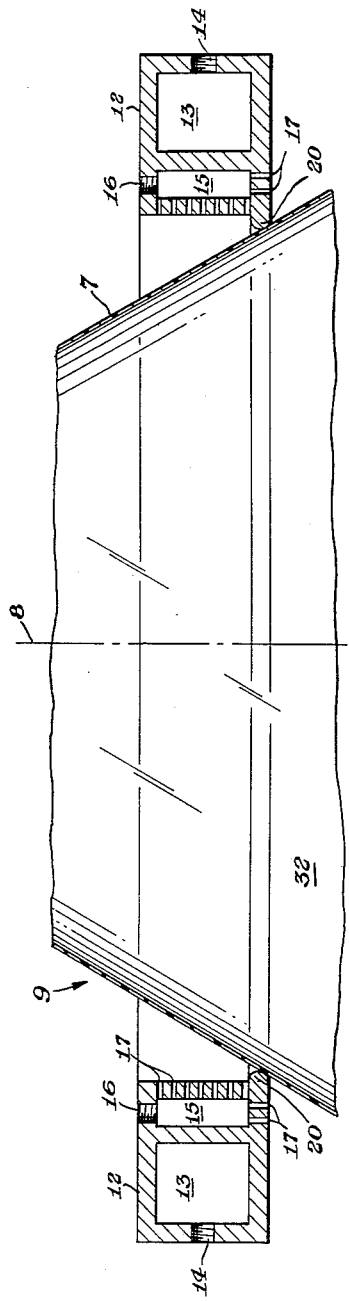
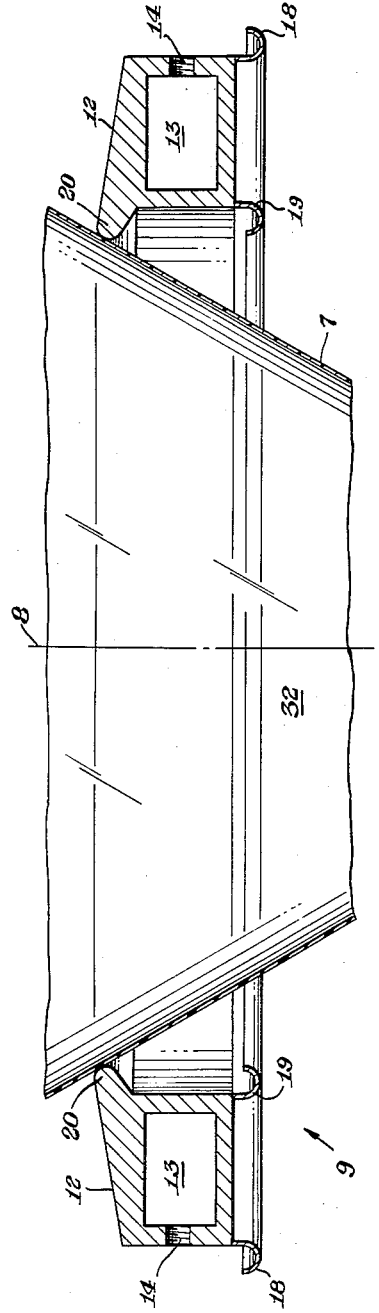

United States Patent Office 2,963,742
Patented Dec. 13, 1960

2,963,742
FILM TUBE GUIDE

Harold G. Ahlich and James L. Amos, Midland, Mich., assignors to The Dow Chemical Company, Midland, Mich., a corporation of Delaware Filed Mar. 18, 1957, Ser. No. 646,638

8 Claims. (Cl. 18—14)

This invention relates to an improved guiding means or apparatus for plastic films in tubular form that is particularly adapted to align or centrally position a freshly extruded film tube which is being oriented by an internal distending gas bubble simultaneous with and immediately upon extrusion.

It is advantageous to manufacture films of many thermoplastic resinous materials in tubular form. In the practice of such operations, it is oftentimes desirable (and may even be necessary) to orient the freshly extruded film simultaneous with its extrusion by stretching it uniformly throughout the directions of its major dimensions. An efficacious technique for accomplishing such orientation utilizes the distending effect of an entrapped pocket or bubble of gas which is enveloped under pressure within the tubular film simultaneously with its initial formation. A tubulation process of this nature has been disclosed by one Edward T. Fuller in United States Letters Patent No. 2,461,975, When plastic film tubes are oriented immediately upon extrusion by internal distending gas bubbles, it may be difficult to maintain them in suitable coaxial alignment with the longitudinal center-line of extrusion which extends centrally through and from the axis of the tubing die or other tubular film-forming means that is employed. Minor variations in thickness and temperature in the freshly extruded film tube tend to cause its continual oscillatory movement around the extrusion center line. If not corrected, such behavior may cause inferior film products to be obtained. Circular ring guides that circumferentially contact the freshly extruded film tube are known and have been employed to restrain the lateral movement of and to thereby centrally position the tube during its initial extrusion and bubble distension.

Such guide rings, however, introduce additional difficulties when the plastic film that is being extruded contains volatile constituents including monomers, dimers trimers and the like as well as various diluents that may be present in the film-forming composition. It is usual, for example, for many thermoplastic film-forming compositions that are adapted to be utilized for extrusion in tubulation processes to contain from 0.3 to 2.5 percent by weight or so of various volatile constituents. The volatile constituents generally escape from the tubular extrudate before it has cooled from the elevated film-forming temperature. Portions of these volatiles unavoidably condense on the free surfaces of the guide ring and eventually form in sufficient quantities thereon to fall from the guide onto the tubular film being handled therethrough. As can be readily appreciated, such occurrences have an extremely deleterious effect on the film. Generally, the condensed volatiles that come in contact with the film surface cause it to become marred and otherwise impaired and result in the manufacture of less than premium quality film products.

To overcome this, guide rings have been proposed and employed which contain an absorbent material for assimilating the condensed volatiles that tend to collect on their free surfaces. Unfortunately, however, the absorbent material in such guides eventually becomes saturated with condensate and must be removed and replaced with fresh supplies. This, of course, necessitates disruption of the extrusion operation during the time that the guide ring is being changed or refurnished with the absorbent. The "down-time" interruptions not only involve considerable labor and manufacturing inefficiency, but minimize the production capacity during unit intervals of operation that may be realized with given film-forming installations.

It would be highly advantageous, and it is the principal object of the present invention, to provide an improved guide ring for film tubulation processes of the indicated variety that would be capable, without difficulty, of handling volatile constituents from the plastic film that might condense on its surface without involving or necessitating periodic discontinuations of the extrusion operation in order to service the guide so as to maintain or reestablish its effectiveness. Other advantages, beneficial features and purposes of the present invention will be manifest in the ensuing description and specification.

A guide ring for tubular plastic film that contains escaping volatile constituents in accordance with the present invention, especially for film tubes that are being oriented by bubble distension techniques simultaneous with extrusion, comprises means defining a generally circular guide ring having an inner, centrally disposed peripheral film-contacting surface that is adapted to circumferentially contact and guide a plastic film tube being passed interiorly therethrough; means for cooling the surface of said guide to a temperature beneath the condensing temperature of volatile constituents escaping from said plastic film (which temperature will generally fall within the range from 40 to 200° F., as may be best suited in specific instances); means for collecting condensed volatile liquids from the surface of said guide; and liquid withdrawing means in combination with said collecting means in said guide ring for continuously disposing of condensed volatile constituents from said plastic film that accumulate upon and are collected from the surface of said guide ring.

Advantageously the guide ring is hollow and cooled by interior circulation of a suitable heat-exchanging fluid, such as water or chilled air, therethrough. The collecting means, as well as the continuous condensate disposing means, may be a circumferential aspirator that is incorporated interiorly in and effective on the surface of said guide ring or, particularly when the guide is horizontally disposed to pass the film tube vertically therethrough, it may comprise a circumferential liquid collecting trough (or troughs) at the lowermost peripheral surface (or surfaces) of said guide. Although it is usually satisfactory for the guide ring to have a circular or nearly circular configuration, it may also be suitably formed in oval, elliptical and other forms that are merely generally circular in outline.

The invention is further illustrated in connection with the accompanying drawing, wherein:

Figure 1 is a cross-sectional schematic representation of a film tube manufacturing operation wherein a guide ring in accordance with the invention is employed; and Figures 2, 3, 4, and 5 show various embodiments of the guide ring in cross-sectional elevation.

Referring initially to Figure 1, there is schematically illustrated a film tubulation process in which the freshly extruded plastic film tube 7 is being oriented simultaneous with extrusion by a distending gas bubble 32 which is entrapped within the tube under sufficient pressure to cause its stretching. The film tube 7 is extruded through a tubing die 4 in which a suitable film-forming material from a supply source (not shown) is expressed through a circular orifice 6 coaxial with an extrusion center-line 8 passing longitudinally through the center of the die. A central passageway 5 in the die 4 may be employed to admit air or other gas and other materials (such as lubricants) within the film tube 7. A guide ring in accordance with the present invention, and indicated generally by the reference numeral 9, is employed with great advantage to center and coaxially position the distended film tube 7 passing through the guide about the extrusion center-line 8. The film tube 7, after being oriented by the distending gas bubble 32, is withdrawn from the die 4 through a pair of pinch rolls 11 subsequent to passage through the collapsing guides 10 which tend to flatten the tube of film so that it may be more efficiently grasped and handled in the bight of the rolls 11.

One advantageous embodiment of the guide ring 9 may be in accordance with that which is depicted in Figure 2. The ring is comprised of a housing 12 having a generally rectangular cross-section and being provided with two interior annular passageways 13 and 15, respectively. A centrally disposed, inner circumferential film-contacting guide surface 20, suitably smooth and appropriately finished for the intended film-contacting purpose, is provided within the ring, advantageously as the film-contacting guide projection that is shown. One of the passageways may be employed for circulation of the coolant through the guide ring. It is generally preferred, as shown, to utilize the outer annular passageway 13 for this purpose and to provide apertures 14 in the housing 12 to communicate with the passageway in order to facilitate the admission and removal of the coolant for the guide ring. The means for removing the condensed volatiles from the surface of the guide ring is provided by and with the other annular passageway 15 that is formed within the housing 12 and which is closer to the center of the ring and more immediately adjacent to the film tube 7 being handled by the guide. The passageway 15 is in communication with the surface of the guide ring 9 through a plurality of relatively small (and preferably uniformly spaced) openings 17. In this way, the passageway 15 may be utilized for aspirating the surface of the guide ring by connection with a suitable vacuum source (not shown) through the outlet (or outlets) 16 that lead therefrom.

It is also generally preferred for at least the inner surface of the guide ring 9 that is next to and roughly parallel with the film tube to be provided with the suction openings 17 through which both vaporous and condensed volatiles escaping from the film may be aspirated. And, as shown, it may also be advantageous to provide similar openings 17 for the same purpose in at least a portion of the surface or surfaces leading to the inner surface of the ring. Of course, if desired, the entire surface of the guide ring 9 may have openings leading directly to the vacuum passageway 15 by various means that will occur to those who are skilled in the art. Thus tubes or the like conduits from the vacuum passageway 15 may extend through the coolant passageway 13 to emerge on the remaining, more outwardly disposed, surface of the guide ring. Or, the vacuum passageway 15 may be made to actually surround or partially envelop the coolant passageway 13 in the guide (or, vice-versae, with suitable tubular or other openings leading from the surface of the guide ring to the vacuum passageway). Condensate collected by and withdrawn from the aspirating passageway 15 may be disposed of in any desired manner as by liquid traps, scrubbers, absorbing units and the like or equivalent means. And, as is apparent, a certain amount of uncondensed volatiles may be drawn directly into the aspirating passageway without actually condensing on the surface of the guide ring.

The size, number, and spacing arrangement of the suction openings 17 may be in accordance with the needs and requirements of particular situations, depending upon the relative quantity, in given instances, of condensate to be removed from the surface of the guide (as well as the physical characteristics of the vapors and condensate being aspirated) and the degree of vacuum that is available or being utilized for the aspiration. Generally, without limitation thereto, it is desirable for the openings 17 to be round with diameters between about one-thirty-second to one-quarter of an inch (preferably from one-sixteenth to one-eighth) and spaced in an essentially square, diamond or triangular pattern with their on-center spacings in the pattern being from two to eight (preferably from two to four) times their diameters or other major dimensions. Finer openings at more frequent intervals generally require application of greater vacuum for optimum results. On the other hand, the openings should not be so large as to have an aspirating effect for considerable distances from the surface. This might damage the film passing through the guide. In this connection, it is generally suitable for the attainment of excellent aspirating effects to employ a vacuum as measured by an absolute pressure that is only from about 10 to 30 millimeters of mercury less than atmospheric pressure although, if desired, greater vacuums may be drawn and utilized.

An aspirating guide ring for tubular film in accordance with or analogous to that represented in Figure 2 of the drawing may be employed with great benefit in any position. Thus, it may be utilized to handle a tube that is being horizontally extruded in the more commonly encountered manner. Or, with great advantage, it may be employed for vertically extruded film tubes or with those being forwarded at various angles between the vertical and horizontal in order to accomplish a manner of operation that is exceedingly difficult, if not impossible, to achieve with conventional guide rings due to the very serious problem of condensate run-off from the guide.

Figure 3:
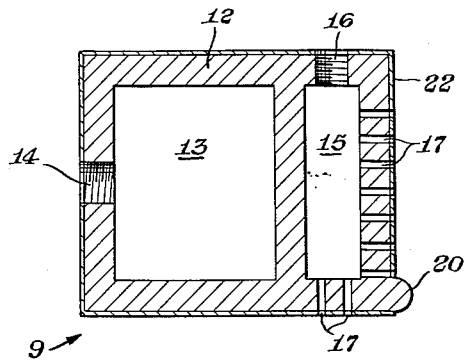
Figure 5:
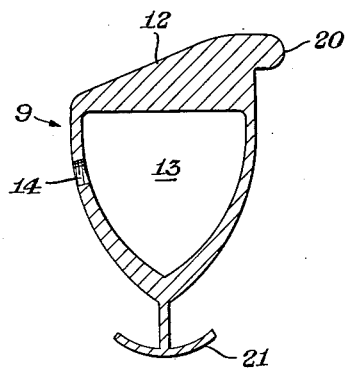

In many cases, it may be of particular advantage to provide an absorbent felt or other wick-like textile cloth or fabric cover, such as a felt material, over all (or at least a portion) of the non-film contacting surfaces of the aspirating guide ring. Such a cover 22 is depicted in the single cross sectional view of the aspirating guide ring 9 that is depicted in Figure 3 of the drawing. The cover 22 may oftentimes be found to have a blotter or wick-simulating effect on the condensing surface of the guide ring. This may frequently facilitate a better and more uniform distribution of the vapor and condensate coming in contact with the surface of the guide and being aspirated therein. The cover 22 may also serve to strain or filter foreign particles that might otherwise be drawn into the suction holes 17. In addition, it may also advantageously prevent or minimize sweating by the cool guide during operation under relatively humid conditions.

When a vertical or substantially vertical manner of extrusion is being effected in the tubulation process, in either an upward or downward direction, the guide ring may also be fashioned in accordance with the embodiment set forth in Figure 4 of the drawing. As shown, the inner circumferential film-contacting guide surface 20 is arranged to project inwardly at a point above the lowermost point of the cooled guide 9, preferably at the uppermost inner portion thereof. The housing 12 of the guide ring 9 is shaped with its exterior, condensate-collecting surfaces slopingly disposed and arranged to run down and drain into collector gutters or troughs 18 and 19 that are circumferentially positioned at the lowermost inner and outer peripheral surfaces that are respectively encircling the guide. The condensate collected in the troughs 18 and 19 can be withdrawn therefrom in any suitable manner, including pumping means or gravity drainage. A variation of this arrangement utilizing a single bottom collecting trough 21 is illustrated in the plain single cross-sectional view in Figure 5; the housing 12 of the cooled guide ring 9 being roughly triangularly shaped in cross-section so as to accommodate run down of the condensate into the single bottommost trough. Of course, regardless of the precise shape of the guide ring that is employed, embodiments should and can easily be arranged to avoid physical interference of the distending film tube passing through the guide.

By way of further illustration, a guide ring embodied similarly to that depicted in Figure 2 was employed to handle a styrene polymer film tube during its vertically downward extrusion in a gas bubble distending process. The plastic film-forming composition, upon its extrusion at a temperature of 150–165° C., contained about 0.5 percent by weight of volatile constituents. These included dimer, trimer and other relatively fugacious low molecular weight polymers as well as minor proportions of such diluents as ethyl benzene and diethyl benzene that had been added to the composition during its polymerization. The volatile constituents represented the unextracted fugacious residue that was not removed from the composition despite its having been subjected to a conventional devolatilization operation. The composition was extruded at a rate of about 90 pounds per hour into a film having an average thickness of 1–10 mils after a ten-times stretch orientation by the distending gas bubble. The guide ring had a ten inch film-contacting diameter. Its radial thickness was about two inches and its height about one inch. Cooling water, at a rate of about four gallons per minute and a temperature of about 70° C. was internally circulated through the guide ring. The suction holes on the inner surface of the guide had a diameter of about one-sixteenth of an inch and were spaced in a square pattern about one-quarter inch on-centers. No condensate was observed to form on the surface of the guide ring during continuous extrusion periods of as long as four hours when vacuums that were from 10 to 30 millimeters of absolute mercury pressure less than atmospheric pressure were maintained in the aspirating passageway communicating with the suction holes. Identical results were obtained with another guide ring operated in the same manner and similar in all details of construction excepting that the on-centers spacing between the adjacent suction holes was about one-eighth of an inch.

In contrast, when the same guides were employed under exactly the same conditions and circumstances excepting that no vacuum was applied or effected through the section holes, the condensate formation and build up was so heavy and its consequences so serious that spotting and marring of the film surface was encountered within a two hour period.

Another guide ring in accordance with the invention, similar to that shown in Figure 4, was also employed under the same extrusion conditions with the same film-forming composition. The guide ring also had a ten inch film-contacting diameter and was cooled with four gallons per minute of 70° F. water. Its radial thickness and innermost height were about two inches and one inch respectively with its upper surface sloping out and down at an angle from the horizontal of about 30°. No condensate remained on the surface of the guide or fell therefrom to mar the film during continuous extrusion periods of four hours.

The guide rings of the present invention can be employed with great benefit for handling film tubes in the indicated manner of any thermoplastic film-forming composition that contains appreciable quantities of volatile constituents having a tendency to escape upon extrusion of the composition. They may be employed with especial advantage in the tubulation of films comprised of various styrene polymers including polystyrene, film-forming copolymers of styrene with acrylonitrile, alpha-methyl styrene, ethyl acrylate and the like and mixtures thereof as well as for various vinyl toluene polymers, vinyl chloride polymers, acrylonitrile polymers, non-aromatic hydrocarbon polyolefins including polyethylene and polypropylene and the like or analogous film-forming compositions. As is apparent, guide rings in accordance with the invention are not restricted in use for handling film tubes in bubble distending processes, although their unique attributes particularly adapt them for such purposes.

The scope and purview of the present invention is to be gauged in the light of the hereto appended claims rather than strictly from the foregoing illustrative description and specification.

What is claimed is:

1. A guide ring for tubular plastic film containing escaping volatile constituents which comprises means defining a generally circular guide ring having an inner peripheral film-contacting surface, said ring being so shaped as to be adapted to circumferentially contact and guide a plastic film tube being passed interiorly therethrough with a single, circumferential line of contact between the ring and such film tube; means for cooling the surface of said guide to a temperature beneath the condensing temperature of volatile constituents escaping from said plastic film; means for collecting condensed volatile liquids from the surface of said guide; and means in combination with said collecting means in said guide ring for continuously withdrawing and removing from said collecting means condensed volatile constituents from said plastic film that accumulate upon and are collected from the surface of said guide ring.

2. A guide ring for tubular plastic film containing escaping volatile constituents which comprises hollow ring-like means defining a generally circular guide ring having an inner peripheral film-contacting surface, said film-contacting surface being so shaped as to be adapted to circumferentially contact and guide a plastic film tube being passed interiorly therethrough with a single, circumferential line of contact between the ring and such film tube; means interiorly dividing said hollow ring-defining means into two separate annular passageways; means for circulating a coolant fluid through one of said annular passageways; at least the centrally disposed non-guiding surface of said ring-defining means having a plurality of openings extending to and communicating with the other of said passageways; and means for evacuating said passageway in communication with the surface of said guide ring.

3. A guide ring according to claim 2 and including, in addition thereto, an absorbent, wick-like cloth or fabric cover over at least a portion of its non-film-contacting surface.

4. A guide ring for tubular plastic film containing escaping volatile constituents which comprises a hollow, ring-like housing having separate inner and outer annular passageways formed therein; an inner peripheral film-contacting projection on said housing, said film contacting projection being so shaped as to be adapted to circumferentially contact and guide a plastic film tube being passed interiorly therethrough with a single, circumferential line of contact between the ring and such film tube; means for circulating a coolant fluid through said outer annular passageway; at least the centrally disposed non-guiding surface of said housing having a plurality of spaced openings therein leading to said inner annular passageway; and means for evacuating said inner annular passageway.

5. A guide ring according to claim 4, wherein said openings are round holes having diameters between about one-thirty-second to one-quarter of an inch spaced in a regular pattern on centers that are from two to eight times their diameters.

6. A guide ring according to claim 4, wherein said openings are round holes having diameters between about one-sixteenth and one-eighth of an inch spaced in a regular pattern on centers that are from two to four times their diameters.

7. A guide ring for vertically handling tubular plastic film containing escaping volatile constituents which comprises a hollow ring-like housing; an inner peripheral film-contacting projection on the uppermost portion of said housing, said film contacting projection being so shaped as to be adapted to circumferentially contact and guide a plastic film tube being passed in a generally vertical direction therethrough with a single, circumferential line of contact between the ring and such film tube; said housing being shaped with its surfaces disposed to slope downwardly to its lowermost portions from said uppermost, inner film-contacting projection; means for circulating a coolant fluid through said housing; and circumferential trough means at the lowermost portions of said housing for collecting condensed volatile constituents draining from the surface of said housing.

8. In a guide ring for plastic film tubes that is so shaped so as to be adapted to circumferentially contact and guide a plastic film tube being passed interiorly therethrough with a single, circumferential line of contact between the ring and such film tube, means in said ring for cooling the surface of said ring and means in said ring for aspirating the surface of said ring.

References Cited in the file of this patent

UNITED STATES PATENTS

| | | |
|---|---|---|
| 871,524 | Pulvermann | Nov. 19, 1907 |
| 1,814,468 | Dreyfus et al. | July 14, 1941 |
| 2,369,484 | Nadeau | Feb. 13, 1945 |
| 2,480,851 | Goss | Sept. 6, 1949 |
| 2,641,022 | Kress | June 9, 1953 |
| 2,832,294 | Ahlich et al. | May 6, 1958 |

FOREIGN PATENTS

| | | |
|---|---|---|
| 1,134,102 | France | Nov. 26, 1956 |